Patented May 17, 1932

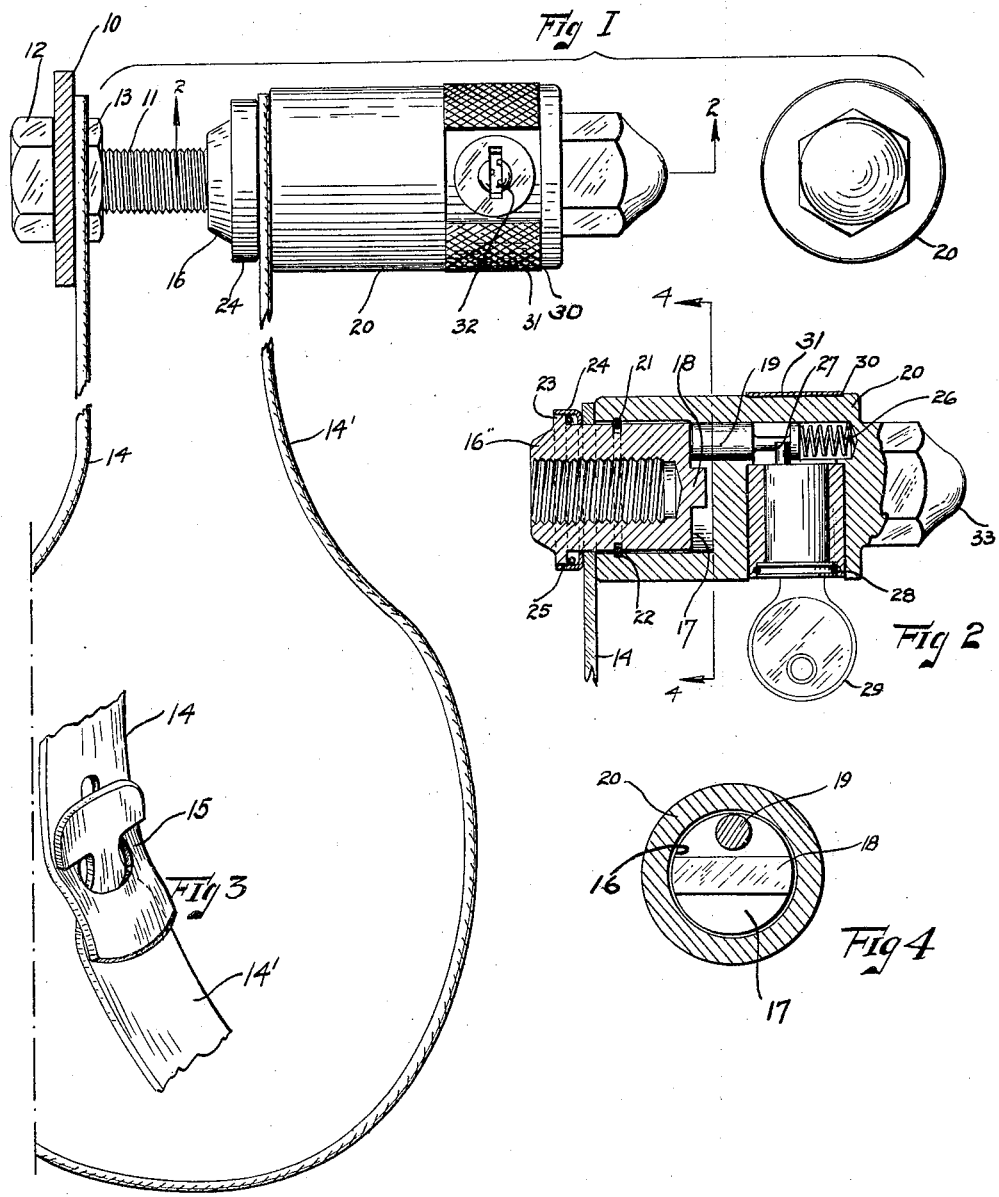

1,858,893

UNITED STATES PATENT OFFICE

FREDERIC K. HEYER, OF STAMFORD, CONNECTICUT, ASSIGNOR TO THE YALE & TOWNE MANUFACTURING COMPANY, OF STAMFORD, CONNECTICUT

LOCK

Application filed October 12, 1929. Serial No. 399,117.

This invention relates to means for locking a spare tire or a spare wheel on an automobile. More particularly, my invention comprises a strap which surrounds the tire or wheel and is adapted to be secured to the frame of the automobile by lock controlled means.

Referring to the drawings where one form of my invention is shown, Fig. 1 is a general view showing the tire surrounding strap and the lock controlled means for locking the same in position. Fig. 2 is a section on the line 2—2 of Fig. 2, showing the lock controlled means in detail. Fig. 3 is a view of the means for joining together two parts of the strap. Fig. 4 is a section on the line 4—4 of Fig. 2 showing additional details of the locking means.

Referring now more particularly to the drawings, reference numeral 10 indicates a frame part of the automobile to which is secured the screw threaded bolt 11 by means of its head 12 and the locking nut 13. Held on bolt 11 between the locking nut 13 and the frame 10 is one part of a steel strap 14 which comprises two parts held together by a joint 15 of any usual type, the preferred modification shown in Fig. 3 being disclosed in the patent to Miller 1,178,172.

For locking the strap 14 in position when the wheel or spare tire is in place, I employ a nut 16 which is screw threaded for cooperation with the bolt 11. The top surface of nut 16 is cut away at 17 so as to leave an upstanding lug 18 which is adapted to cooperate with the bolt 19 in a manner to be described presently. The casing 20 is adapted to surround the nut 16 and to be held against lateral movement relatively thereto by a spring ring or a retaining wire 21 which lies in cooperating grooves 22 of the nut and casing.

The nut 16 is equipped with a shoulder 23, which is adapted to lie outside the casing 20 as is clearly shown in Fig. 2. In the position of the nut as illustrated in Fig. 2, there is a groove between this shoulder portion 23 and the end of the casing 20, in which groove is maintained the strap 14, in secured relation to the nut and the casing. The protecting ring 24 is also held in this groove as is clearly shown in Fig. 2. This protection ring 24 is held in an outwardly pressed position by a spring ring 25 and serves to prevent manipulation of the nut 16 by a tool inserted surreptitiously between the strap 14 and the spare tire or wheel. The bolt 19, carried by the casing 20 is normally pressed in an outward direction by spring 26 and is adapted to be retracted by the cam 27 of the locking cylinder 28, when the same is operated by its key 29. The casing 20 is grooved at point 30 for the mounting of a circular strap 31 which is partially cut away but may be turned into a position to protect the keyhole 32 of the plug 28. A hexagonal head 33 is integral with casing 20 and may be operated by a wrench when it is desired to rotate the casing.

From the above description, it will be readily understood that when bolt 19 is held retracted by cylinder cam 27 the casing 20 will rotate freely relatively to the nut 16. When it is desired to rotate the nut 16, it is merely necessary to rotate the key 29 and cylinder 28 so as to permit bolt 19 to cooperate with lug 18 of the nut 16. Rotation of the casing 20 by means of the nut head 33 will then be effective in operating the nut 16 to secure or release the strap 14 relatively to the bolt 11.

While I have shown one specific modification in my invention, it should be understood that adaptations of the same within the scope of the claims will readily occur to one skilled in the art.

I claim:

1. An automobile tire lock comprising a strap adapted to surround the tire, means for securing said strap in position comprising a bolt, a nut threaded on said bolt, a casing surrounding said nut and secured against axial movement relatively thereto, a headed portion of said nut adapted to extend outside of the casing to create a groove in juxtaposition to said casing, said groove being adapted to carry said strap.

2. An automobile tire lock comprising a strap, means for securing said strap comprising a threaded nut, a casing surrounding said nut and held against axial movement relatively thereto, a shouldered portion of said nut extending beyond the casing, said strap being secured on said nut between said shoulder and casing, and a protecting ring for said extended portion of the nut.

3. An automobile tire lock comprising a strap, a nut, a casing surrounding the operating part of said nut and secured against axial movement relatively thereto, said casing being normally free to rotate relatively to said nut, key controlled means for locking said casing to said nut so as to permit operation of the nut by movement of the casing, a portion of said nut being adapted to extend beyond the casing, said strap being secured to said extending nut portion, and means for protecting said extending nut portion against operation.

4. An automobile tire lock comprising a strap, a nut, a casing surrounding the operating part of said nut and secured against axial movement relatively thereto, said casing being normally free to rotate relatively to said nut, key controlled means for locking said casing to said nut so as to permit operation of the nut by movement of the casing, a portion of said nut being adapted to extend beyond the casing, said strap being secured to said extending nut portion.

Signed at Stamford, in the county of Fairfield and State of Connecticut this 11th day of October, A. D. 1929.

FREDERIC K. HEYER.